United States Patent Office 3,457,033
Patented July 22, 1969

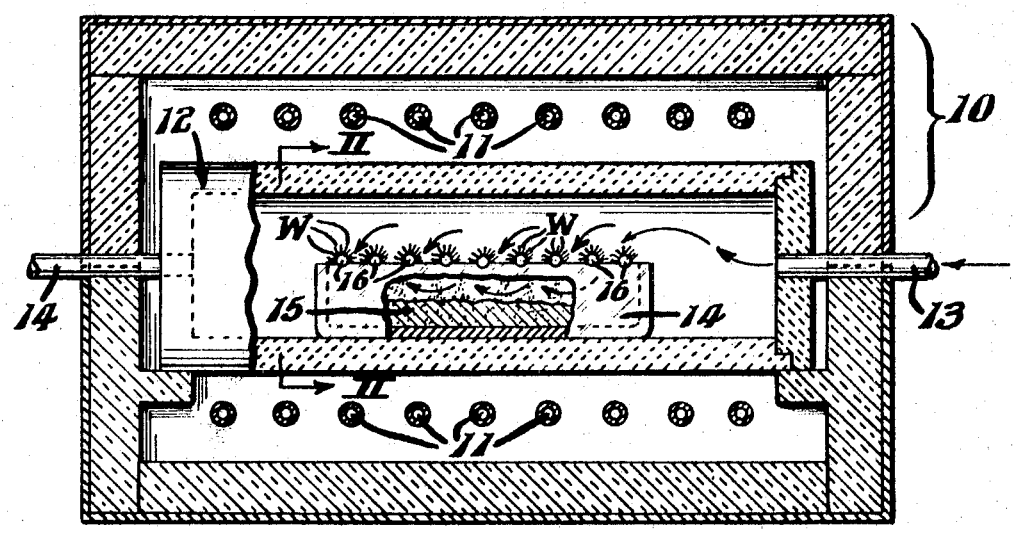
FIG_1
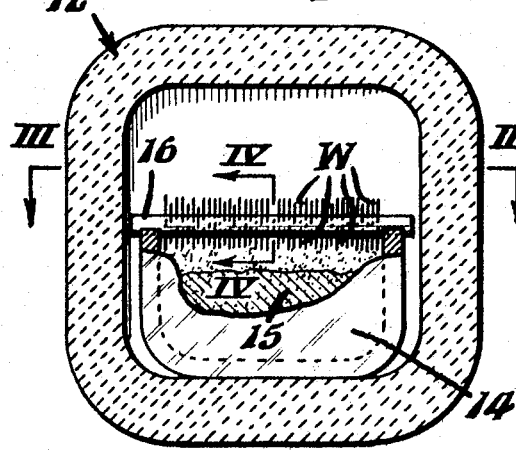
FIG_2
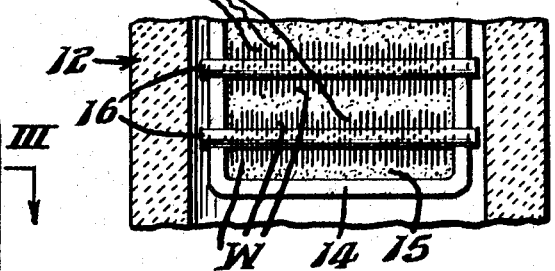
FIG_3
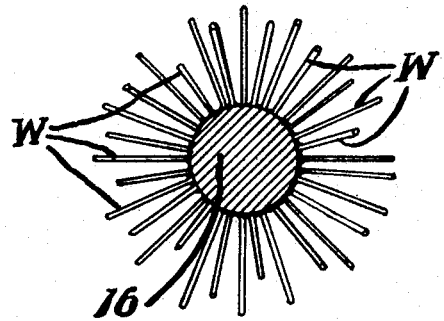
FIG_4
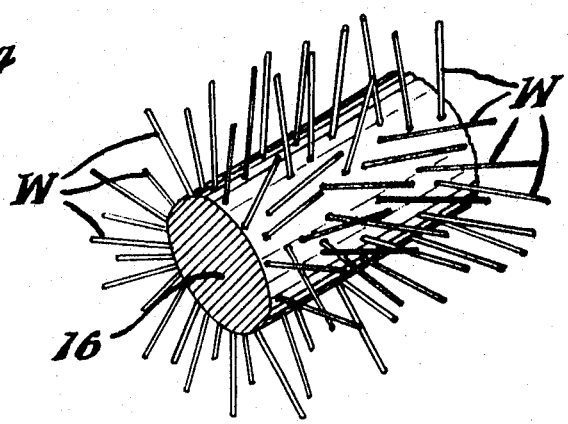
FIG_5
INVENTORS.
Arno Gatti &
William Laskow

3,457,033
PROCESS FOR PRODUCING MAGNESIA-ALUMINA SPINEL WHISKERS
Arno Gatti, Norristown, Pa., and William Laskow, Haddonfield, N.J., assignors to General Electric Company, a corporation of New York
Filed Dec. 17, 1965, Ser. No. 514,630
Int. Cl. C01f 7/04, 5/02
U.S. Cl. 23—52  9 Claims

ABSTRACT OF THE DISCLOSURE

Magnesia-alumina spinel whiskers comprise a new cubic crystalline, generally monocrystalline, product having good high temperature strength. They are made by heating aluminum, silica and magnesia, preferably with alumina also included, to a temperature of 1300–1500° C. in an atmosphere of inert gas, wet hydrogen or dry hydrogen, for a period of from 5 to 15 hours.

---

This invention relates to alumina spinel whiskers and to a method for making them.

In recent years, crystalline whisker production has gained considerable impetus because of its strength-imparting characteristics. Crystalline forms of alumina and various other materials have exhibited extremely high tensile strength. This alone is of considerable importance for a wide variety of reenforcing applications.

For example, if one embeds at random, in metallic aluminum, a multiplicity of whiskers made of a refractory material such as alumina ($Al_2O_3$), in a manner similar to the use of glass fibers in organic plastics, the resulting structure has surprisingly good high temperature strength. Moreover, the system can function at a high temperature in relation to the normal working temperature of the metal; heretofore the best enhancement of a structure's high temperature strength has been produced by the use of pure, crystalline growths of $Al_2O_3$ which, because of their elongated fiber-like form, are called "whiskers."

It is an object of this invention to provide a whisker having improved high-temperature strength as compared to alumina which imparts improved high-temperature strength to metals when embedded therein, and which as an individual whisker has a symmetrical crystalline structure of great tensile strength.

It has been discovered that a composite whisker structure of alumina spinel ($MgO \cdot Al_2O_3$ or $MgAl_2O_4$) may be grown under carefully controlled conditions, and that the product, even if in the form of short fibers has the outstanding properties referred to above. Moreover the process produces single crystal whiskers of $MgAl_2O_4$ which have the most desirable strength characteristics due to their inherent crystalline perfection.

According to this invention, a cubic crystalline whisker (fiber) of alumina spinel is created by means of a vapor phase reaction between aluminum vapor and magnesia in either a dry inert atmosphere or in dry or wet hydrogen gas at about 1300° C. to about 1500° C., in the presence of silica or other suitable auxiliary source of oxidant. The proper growth of the alumina spinel whiskers requires careful control, and is enhanced by providing optimum flow rates of gases throughout the heated zone of reaction to maintain sufficiently high concentrations of the vapor phase reactants at the situs of crystal growth.

The reaction mechanisms, though imperfectly understood, are believed to follow these paths when a hydrogen atmosphere is used ($v$ representing vapor and $s$ solid):

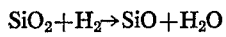
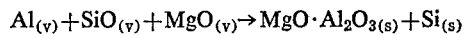

The silicon dioxide-hydrogen reaction is particularly preferred because it proceeds at a natural rate which coacts with the other reactions taking place in a manner to produce optimum alumina spinel crystals.

Of course, in an inert atmosphere, there is much less SiO available and this medium is therefore not preferred, but it can also be used, since $SiO_2$ plus temperature does yield some silicon suboxide (SiO).

It has been discovered that the growth rate of $MgAl_2O_4$ cubic crystalline whiskers is substantially proportional to the amount of supersaturation of the environment at the situs of growth with the reactants. The degree of supersaturation at the nucleation site is believed to be a function of temperature at the situs of the material. It has been observed that the heating of aluminum to its vapor phase in the presence of MgO (magnesia refractory) produces a homonucleation phenomenon by providing a saturation of gaseous environment at the situs of spontaneous nucleation. Optimum growth of alumina spinel whiskers depends to a large extent upon the idiosyncrasies of the particular system employed.

It is important that $MgAl_2O_4$ in cubic crystalline form differs from previously obtained whisker compositions. It melts at a higher temperature than previously attained in connection with solid solutions such as alumina silica whiskers, and has the valuable capacity for imparting exceptionally good high-temperature strength to metal or metal alloy systems.

Referring now to the drawings:

FIG. 1 represents a somewhat diagrammatic sectional view of an apparatus which may be utilized for carrying out the method according to this invention;

FIG. 2 represents an enlarged sectional view taken as indicated by the lines and arrows II—II which appear in FIG. 1;

FIG. 3 represents a fragmentary sectional view taken as indicated by lines and arrows III—III which appear in FIG. 2;

FIG. 4 represents a greatly enlarged sectional view as indicated by the lines and arrows IV—IV which appear in FIG. 2, showing a magnesia rod, upon which alumina spinel whiskers have been grown in accordance with this invention; and FIG. 5 represents a view in perspective of the rod and whiskers which appear in FIG. 4.

It will be appreciated that the specific forms of the invention selected for illustration in the dawings are selected merely as examples, and have in many instances been shown in schematic or diagrammatic form for purposes of clarity of description. Thus, it is to be appreciated that neither the specific disclosures of the drawings nor the specific terms which are used in the specification that follows, is intended to define or to limit the scope of the invention, which is defined in the claims.

Turning now to the specific forms of the invention selected for illustration in the drawings, number 10 designates a furnace having, for example, electric heating elements 11 arranged to supply heat substantially uniformly to a furnace tube 12. An inlet pipe 13 is provided for conducting hydrogen into the tube 12, and an outlet pipe 14 is correspondingly provided. Disposed within the tube 12 is a boat 14 provided with an aluminum charge 15 and having a multiplicity of magnesium oxide rods 16 arranged in spaced relationship across the top of the boat. The letter W designates whiskers which are grown on the magnesium oxide rods in accordance with the form of the invention there shown. It will be observed in FIGS. 4 and 5 that these whiskers grow in a rather random pattern on the surface of the magnesium oxide rod, and that they are rather straight and elongated in configuration.

Obviously, other particular forms of apparatus may be utilized in order to carry into effect the homonucleation process in accordance with this invention.

Example I

As an example of a process carried out in an apparatus just referred to, twelve magnesia rods (two inches long by one-eighth inch diameter) were arranged in a pure alumina boat also containing aluminum metal, and the boat was placed in a sealed "mullite" silica refractory tube furnace to which pure dry hydrogen was being admitted at a rate of one cubic foot per hour. The "mullite" (aluminum oxide-silicon dioxide) refractory, under the conditions existing, furnishes silica for the reaction:

$$SiO_{2(s)} + H_{2(g)} \rightleftharpoons SiO_{(g)} + H_2O_{(g)}$$

thus providing silicon suboxide gas at the nucleation situs. The MgO rods furnish the magnesium constituent of the final alumina spinel. The overall reaction appears to be:

$$2Al_{(g)} + 3SiO_{(g)} + MgO_{(g)} \rightarrow Al_2MgO_4 + 3Si$$

To perform the nucleation procedure, the assembly was fired for 15 hours at 1350° C. The furnace was cooled and the boat was removed. Upon examination, which included X-ray analysis, profuse amounts of alumina spinel whiskers were produced on the sides of the boat and also around the total surface area of the magnesium oxide rods.

Example II

Another technique employed was to cover a similar pure alumina boat containing aluminum metal with a cover of magnesia refractory in a dome-like fashion. After firing for from 5 to 15 hours in a similar hydrogen atmosphere and furnace arrangement a great many alumina spinel whiskers were seen protruding from the magnesia dome. Still other geometric variations of those mentioned above have been practiced with great success.

It will be appreciated that many variations of the equipment and process may be utilized with similar success. Preferably the temperature of the reaction is in the range of 1300° C. to 1500° C. and within that range whiskers are produced in varying size and number.

It is to be understood that other variations may be practiced. For example, wet hydrogen has been used and excellent alumina spinel whiskers were grown. Also, inert gas, sypecifically argon, was used and excellent alumina spinel whiskers were grown. Similar results are to be achieved with helium, etc. It is also understood that continuous arrangements such as moving belts, etc. can be ably employed as an expedient to increase production.

It is to be understood that equivalents may be substituted for steps, apparatus and features disclosed herein; that parts and steps may be reversed, and that certain features may be used independently of other features, all without departing from the spirit and scope of the invention as defined in the appended claims.

The following is claimed:

1. A process, for producing magnesia-alumina spinel cubic crystalline whiskers, comprising heating aluminum, magnesia and silica, in an atmosphere consisting of an inert gas or hydrogen, to 1300–1500° C. for a period of from 5 to 15 hours.

2. A process, as recited in claim 1, wherein said atmosphere consists of an inert gas.

3. A process, as recited in claim 1, wherein said atmosphere consists of hydrogen.

4. A process, as recited in claim 3, wherein said hydrogen atmosphere also includes a small amount of water vapor.

5. A process, as recited in claim 1, wherein said heating takes places in a closed chamber and wherein said silica is included in a refractory lining for said chamber.

6. A process, as recited in claim 5, wherein said refractory lining is mullite.

7. A process, as recited in claim 1, wherein alumina is also heated along with said aluminum, silica and magnesia.

8. A process, as recited in claim 7, wherein said alumina comprises a boat which holds said aluminum during said heating and in the proximity of which is disposed a solid magnesia member.

9. A process, as recited in claim 8, wherein said boat, aluminum, and magnesia member is heated by placing it in a closed chamber having a mullite liner.

References Cited

UNITED STATES PATENTS

| | | | |
|---|---|---|---|
| 3,023,115 | 2/1962 | Wainer et al. | 23—142 X |
| 3,026,210 | 3/1962 | Coble | 23—142 X |
| 3,083,123 | 3/1963 | Navias | 23—52 X |
| 3,304,153 | 2/1967 | Bakkar et al. | 23—52 |

FOREIGN PATENTS 608,032  11/1960  Canada.

HERBERT T. CARTER, Primary Examiner